United States Patent
Harada et al.

(10) Patent No.: US 6,842,664 B2
(45) Date of Patent: Jan. 11, 2005

(54) CONTROL APPARATUS FOR CUTTING MACHINE, CUTTING MACHINE AND CUTTING METHOD

(75) Inventors: Hisao Harada, Nara (JP); Hiroki Nakahira, Nara (JP); Katsuaki Ono, Nara (JP)

(73) Assignee: Mori Seiki Co., Ltd., Nara (JP)

( * ) Notice: Subject to any disclaimer, the term of this patent is extended or adjusted under 35 U.S.C. 154(b) by 324 days.

(21) Appl. No.: 10/081,303

(22) Filed: Feb. 22, 2002

(65) Prior Publication Data

US 2002/0123823 A1 Sep. 5, 2002

(30) Foreign Application Priority Data

Feb. 23, 2001 (JP) ..................................... P2001-048773

(51) Int. Cl.[7] ............................. B23B 3/00; G06F 19/00
(52) U.S. Cl. ........................ 700/186; 700/117; 700/159; 700/192; 82/118
(58) Field of Search ........................... 700/186, 90, 95, 700/117, 159, 180, 192, 86; 82/117, 118; 318/752

(56) References Cited

U.S. PATENT DOCUMENTS

| | | | | |
|---|---|---|---|---|
| 4,776,247 A | * | 10/1988 | Kiya | 82/118 |
| 4,788,481 A | * | 11/1988 | Niwa | 318/600 |
| 4,998,196 A | * | 3/1991 | Seki et al. | 700/86 |
| 5,373,222 A | * | 12/1994 | Hemmerle et al. | 318/652 |
| 5,513,113 A | * | 4/1996 | Okada et al. | |
| 5,839,943 A | * | 11/1998 | Stadtfeld | 451/8 |
| 6,223,095 B1 | * | 4/2001 | Yamazaki et al. | 700/187 |

* cited by examiner

Primary Examiner—Jayprakash N. Gandhi
(74) Attorney, Agent, or Firm—Osha & May L.L.P.

(57) ABSTRACT

This invention relates to a control apparatus for numerical control in a cutting machine having a turret which can be rotated to arbitrary positions, and characterized by including means for obtaining turret axis data ($\Delta X$, $\Delta Z$) from reference offset values (X0, Z0) corresponding to a length from a cutting edge to a turret axis B, turret angle data $\alpha$, and cutting edge data (m, n), and moving the turret on the basis of these turret axis data ($\Delta X$, $\Delta Z$) to perform a cutting.

7 Claims, 8 Drawing Sheets

| CUTTING EDGE POSITION | X CUTTING EDGE DATA mi | Z CUTTING EDGE DATA ni | TURRET ANGLE $x_i$ |
|---|---|---|---|
| A0 | 0 | 0 | 90° |
| ⋮ | ⋮ | ⋮ | ⋮ |
| A1 | 20 | -10 | 60° |
| ⋮ | ⋮ | ⋮ | ⋮ |
| A2 | 30 | -20 | 30° |
| ⋮ | ⋮ | ⋮ | ⋮ |
| A3 | 35 | -30 | 0° |

FIG. 3B

| TURRET AXIS POSITION | $\Delta X_i$ | $\Delta Z_i$ | TURRET ANGLE $\alpha_i$ |
|---|---|---|---|
| B0 | -5 | 40 | 90° |
| ⋮ | ⋮ | ⋮ | ⋮ |
| B1 | 35.7 | 27.1 | 60° |
| ⋮ | ⋮ | ⋮ | ⋮ |
| B2 | 62.1 | 4.3 | 30° |
| ⋮ | ⋮ | ⋮ | ⋮ |
| B3 | 75 | -25 | 0° |

CONTROL APPARATUS FOR CUTTING MACHINE, CUTTING MACHINE AND CUTTING METHOD

BACKGROUND OF THE INVENTION

1. Field of the Invention

The present invention relates to a cutting machine (specifically a NC lathe or machining center) for performing various cuttings according to numerical control, and a control apparatus for the cutting machine.

Particularly, this invention relates to the control apparatus for the cutting machine in which a turret 1 rotates around a turret axis B (a B-axis) so that a cutting process can be performed at an arbitrary position (capable of indexing at the arbitrary position).

Figure 8:
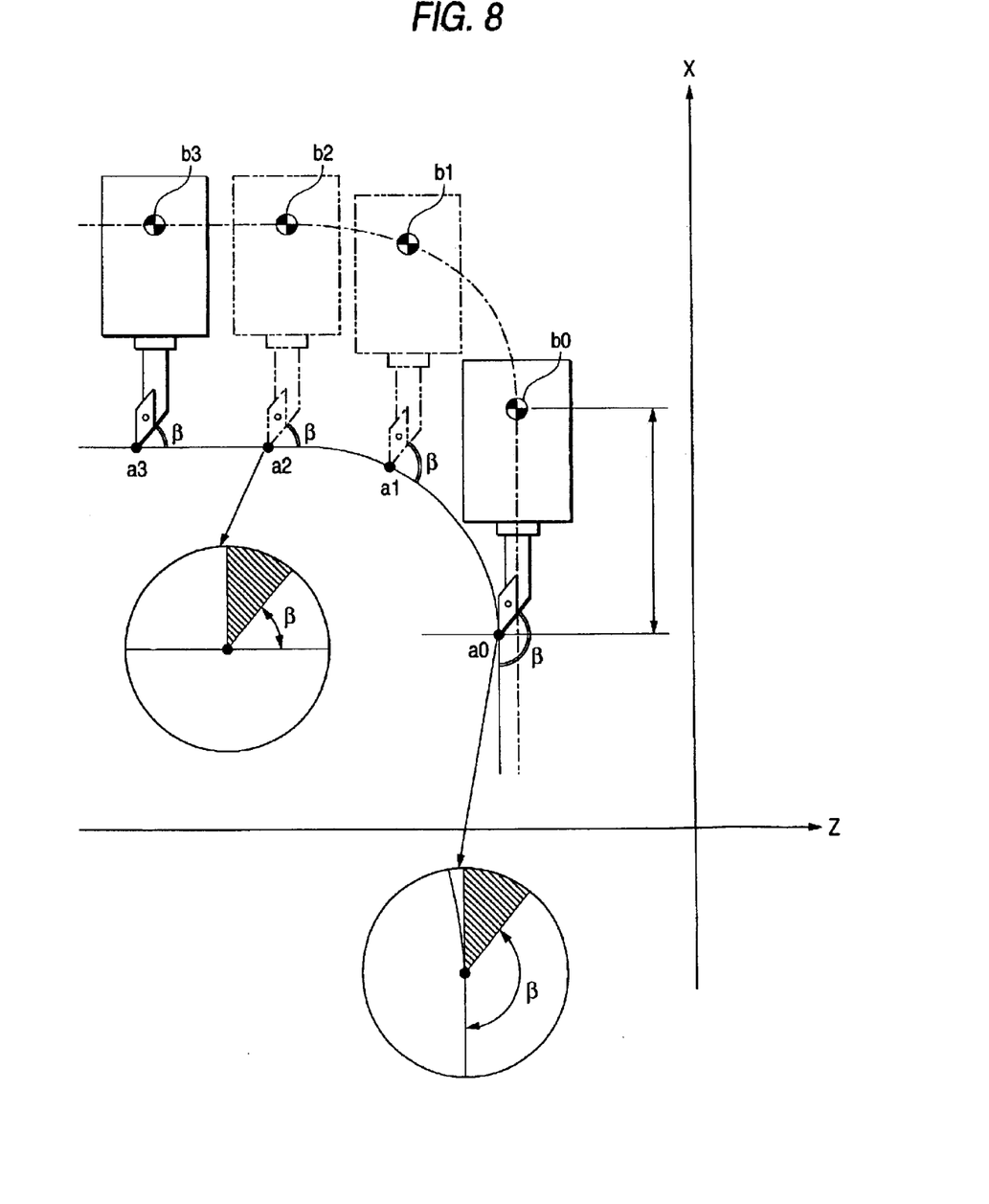
FIG. 8 is a view showing an example of the related art (turret angle is constant)
Figure 9:
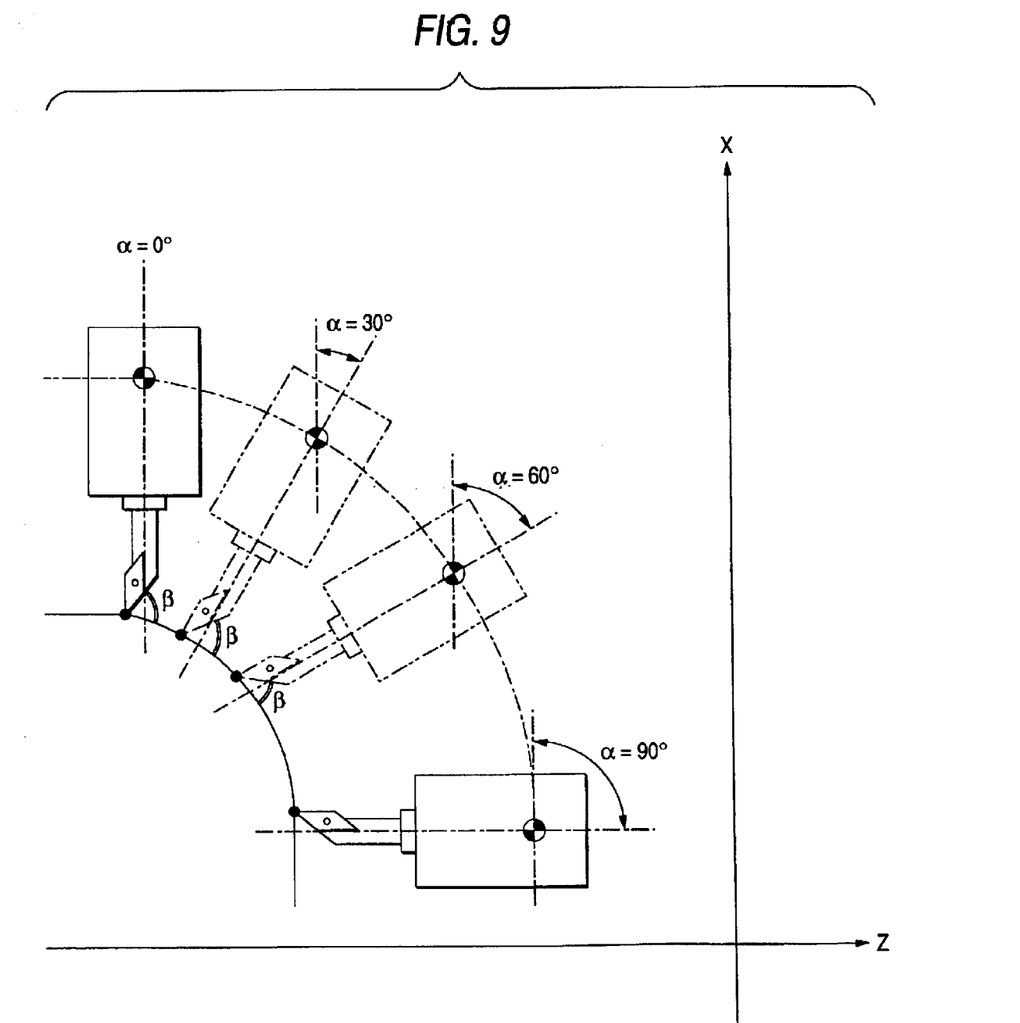
FIG. 9 is a view showing another example of the related art (cutting angle is constant).

2. Related Art (1) Modes of controlling a cutting edge of a cutting tool 2 in a conventional cutting machine are shown in FIGS. 8 and 9. FIG. 8 shows a mode in which a cutting is performed while the turret 1 is kept at a fixed angle. FIG. 9 shows a mode in which the turret 1 is rotated according to an outer configuration of a work to be cut. Respective positions of the cutting edge are represented by a0 to a3, and positions of the turret axis B are represented by b0 to b3.

The cutting tool 2 is usually controlled by controlling coordinates of the turret axis B. Here, in the mode as shown in FIG. 8, the coordinates of the turret axis B can be easily obtained by offsetting distances from the cutting edge to the turret axis B ($\Delta x$, $\Delta z$) out of the coordinates of the cutting edge.

However, there has been a problem that when an arc-shaped surface is cut while keeping the angle of the turret 1 in this manner, an angle between the cutting tool 2 and the work to be cut (a cutting angle $\beta$ shown in the drawings) is not constant.

In case of performing a cutting with high precision, it is desirable to perform the cutting always at the same position of the cutting edge in a single cutting process. Here, the cutting edges at the cutting positions a0 and a2 are shown in enlarged views. At the cutting position a0 in the drawing, the cutting is performed by a left side of the cutting edge. On the other hand, at the cutting position a2 in the drawing, the cutting is performed by an underside of the cutting edge. In this manner, unless the cutting angle $\beta$ is stabilized in the single cutting process, it will be difficult to cut precisely.

The cutting process as shown in FIG. 9 is in the mode in which the turret 1 is gradually rotated according to an outer configuration of the work to be cut. In this mode, the above described problem will not occur, because a fixed cutting angle $\beta$ can be always maintained. However, in this case, it is necessary to obtain the coordinates of the turret axis B Considering the rotation of the turret 1, instead of simply offsetting from the coordinates of the cutting edge. For this reason, in the embodiment as shown in FIG. 9, there has been such a problem that when preparing a program, calculation of the coordinates of the turret axis B has been difficult.

Moreover, it would be necessary to develop a new control program in order to control movement of the turret on the basis of the coordinates of the cutting edge, and enormous cost and time would be required.

SUMMARY OF THE INVENTION

In view of the above, objects of the present invention are to enable cutting processes to be performed always at a same cutting angle $\beta$, and to enable calculation of the coordinates of the turret axis B to be performed easily, when preparing a program. In addition, it is also intended to utilize a conventional control program for controlling on the basis of the turret axis B.

(1) This invention relates to a control apparatus for numerical control in a cutting machine having a turret 1 which can be rotated to arbitrary positions, the control apparatus comprising:

means for inputting cutting edge data (m, n) indicating a position of a cutting edge of a cutting tool 2;

means for inputting turret angle data a indicating an extent of rotation of the turret 1;

means for reading reference offset values (X0, Z0) corresponding a length from the cutting edge to a turret axis B;

means for obtaining offset data (X$\alpha$, Z$\alpha$) from these reference offset values (X0, Z0) and aforesaid turret angle data $\alpha$;

means for adding aforesaid cutting edge data (m, n) to these offset data (X$\alpha$, Z$\alpha$) to obtain turret axis data ($\Delta X$, $\Delta Z$); and means for moving the turret 1 on the basis of these turret axis data ($\Delta X$, $\Delta Z$) to perform a cutting.

This invention aims to perform a cutting by rotating the turret 1 based on a turret angle data $\alpha$ which has been appropriately determined and inputted. Therefore, the problem that the cutting angle $\beta$ as shown in FIG. 8 is to be changed will be eliminated, and the cutting with high precision can be realized.

Moreover, according to this invention, in preparing a program for numerical control, the turret axis data (coordinates) need not be inputted. The turret axis data are obtained by adding the cutting edge data (m, n) to offset data (X$\alpha$, Z$\alpha$) in consideration of the turret angle data $\alpha$. In this manner, a programmer need not calculate the turret axis data in consideration of the turret angle data $\alpha$ when preparing the cutting program, and preparation of the program can be performed easily and rapidly.

Further, according to this invention, the turret axis data are calculated from the cutting edge data and the turret angle, and on the basis of these turret axis data, the turret 1 is controlled. This control of the turret 1 on the basis of the turret axis data is the same as in the conventional example. In short, an already developed program can be employed as the control program for the turret 1. Therefore, one of the advantages of this invention is that the conventional control program for controlling based on the turret axis B can be utilized, and hence, it is not necessary to develop a new control program.

Figure 1:
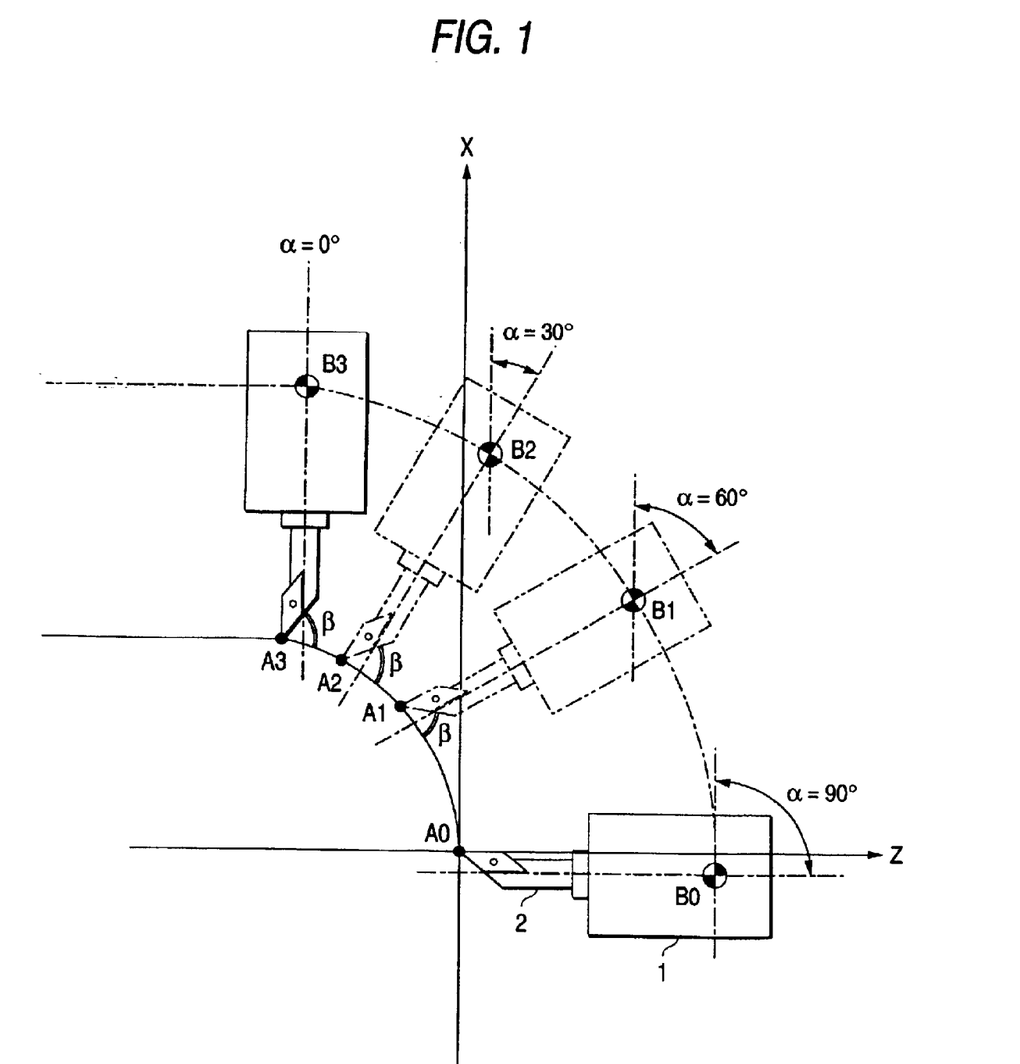
FIG. 1 is a view showing movement of a turret.

(i) The terms "cutting edge data (m, n)" mean coordinates of the cutting edge of the cutting tool 2 which are represented by A0 to A3 in FIG. 1, and they are represented as (m0, n0), (m1, n1) . . . (mi, ni) corresponding to respective positions. A value on an X coordinate is represented as X cutting edge data m, and a value on a Z coordinate is represented as Z cutting edge data n.

(ii) The terms "turret angle or turret angle data $\alpha$, $\alpha$i" mean an angle in which the turret 1 is rotated with respect to a reference line, and its value. It is to be noted that the turret angle and the turret angle data have the same meaning, and when the value of the turret angle $\alpha$ is treated as data, that is, turret angle $\alpha$ when the cutting edge of the cutting tool 2 is at a position Ai is indicated as the turret angle data $\alpha$i. In the below described embodiment of FIG. 1, an X-axis is set to be the reference line. When the cutting tool 2 is at an origin point A0 (when directed to the left), the turret angle is represented as α=90°, and when the cutting edge is positioned at A1, the turret angle is represented as α=60°, similarly, the cutting edge is positioned at A2 and A3, the turret angle is represented as α=30° and α=0°, respectively.

(iii) The terms "reference offset values (X0, Z0)" mean values determined according to sizes of the cutting tool 2 and the turret 1, and the value correspond to a length from the cutting edge of the turret 1 to the turret axis B. These values are not affected by the direction of the turret 1, but are always determined on the basis of the turret 1 or the cutting tool 2. In FIG. 1, the length in a direction of the X-axis when the cutting edge is positioned at A0 is shown as an X reference offset value X0 and the length in a direction of the Z-axis is shown as a Z reference offset value Z0.

Figure 6:
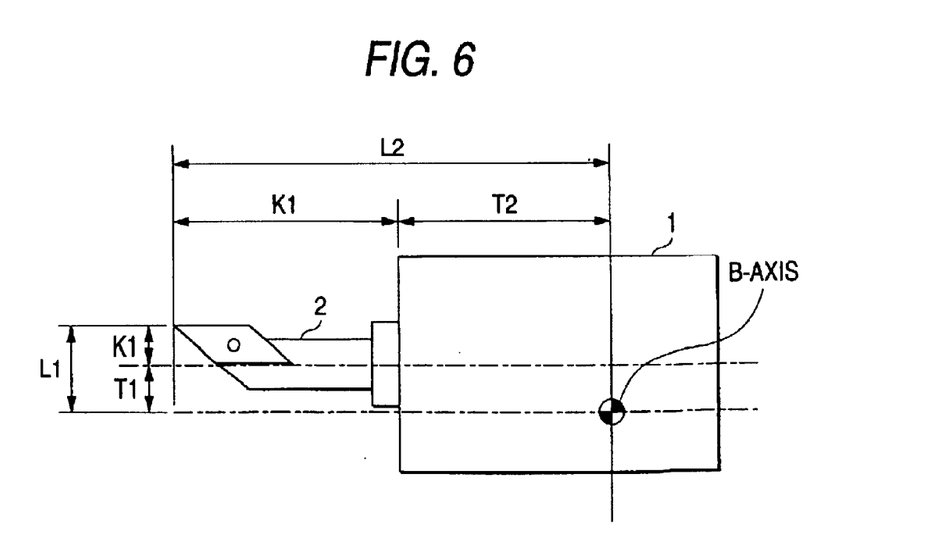
FIG. 6 is a view for explaining reference offset values (X0, Z0)

These reference offset values are determined according to the sizes of the cutting tool 2 and the turret 1, and may be defined as follows, as shown in FIG. 6;

(X reference offset value X0 )=(X tool offset value K1)+(X turret offset value T1)

(Z reference offset value Z0)=(Z tool offset value K2)+(Z turret offset value T2)

Further, in implementing this invention, these tool offset value K and turret offset value T are not necessarily always constant, but can be employed in such a manner that the values may appropriately change according to the movement of the cutting edge and the rotation of the turret. In this case, this reference offset value may be calculated according to the change.

(iv) The terms "offset data (Xα, Zα)" mean the lengths from the cutting edge to the turret axis B in the directions of the X-axis and Z-axis when the turret 1 has rotated, and are represented as X offset data Xα, and Z offset data Zα.

(v) The terms "turret axis data (ΔX, ΔZ)" mean data to be employed for controlling the turret 1, and the data correspond to coordinates from an origin point of the machine to the turret axis B. They are represented by (ΔX0, ΔZ0) . . . (ΔX1, ΔZ1) . . . (ΔX3, ΔZ3) corresponding to the respective positions of the cutting edge. For information, the turret axis B is represented by B0, B1, B2, B3 corresponding to the respective positions of the cutting edge.

(1-1) When preparing the program, the programmer inputs the cutting edge data (mi, ni) which are the coordinates of respective points of the moving cutting edge, and the turret angle data αi which determine an extent to which the turret 1 is to be rotated at every point. As a method for inputting the values, a keyboard, a touch panel and so on may be employed, or a manner of reading from data file such as CAD or the like can be utilized.

(1-2) Once the cutting program has been completed, the program need not be changed when the cutting tool 2 is exchanged, but it is sufficient that the above described tool offset values (K1, K2) may be changed. Accordingly, one of the embodiments according to the invention is the above described control apparatus which includes, memory means for storing beforehand the tool offset values (K1, K2) of various cutting tools 2, means for selecting the cutting tool 2, means for giving instructions to mount the selected cutting tool 2 to an automatic tool changer (ATC), means for reading the tool offset values (K1, K2) of the mounted cutting tool 2 from the memory means, means for obtaining "turret axis data (ΔX, ΔZ)" on the basis of the tool offset values (K1, K2) which have been read, specifically, means for obtaining the "turret axis data (ΔX, ΔZ)" by adding the turret offset values (T1, T2) to the tool offset values (K1, K2).

(Specific Equations for Calculation)

(2) In case where the aforesaid reference offset values (X0, Z0) are constant through the cutting process, one of the embodiments according to the invention is the above described control apparatus characterized in that offset data (Xαi, Zαi) are calculated from the reference offset values (X0, Z0) and the turret angle αi on the basis of the following equations 1 and 2, and the turret axis data (ΔXi, ΔZi) are calculated from these offset data (Xαi, Zαi) and the aforesaid cutting edge data (mi, ni) on the basis of the following equations 3 and 4.

$$X\alpha i = Z0 \cdot \cos \alpha i - X0 \cdot \sin \alpha i \quad \text{(equation 1)}$$

$$Z\alpha i = Z0 \cdot \sin \alpha i + X0 \cdot \cos \alpha i \quad \text{(equation 2)}$$

$$\Delta Xi = mi + X\alpha i \quad \text{(equation 3)}$$

$$\Delta Zi = ni + Z\alpha i \quad \text{(equation 4)}$$

(Sign i: corresponds to respective positions of the cutting edge)

(3) Moreover, this invention relates to a cutting machine which includes the above described control apparatus. With this cutting machine, it will be possible to provide such a cutting machine that the cutting program which has been described above can be prepared easily.

The cutting machine according to this invention may include the ATC as described in the above (1-2), and means for mounting the selected cutting tool 2 to the turret 1.

(4) In case where this invention is considered as a method, the invention relates to a cutting method employing a cutting machine having a turret 1 which can be rotated to arbitrary positions, and the method is characterized by including the following steps;

a step of inputting cutting edge data (m, n) and turret angle data α;

a step of reading reference offset values (X0, Z0);

a step of calculating offset data (Xα, Zα) from the turret angle data α and the reference offset values (X0, Z0);

a step of calculating turret axis data (ΔX, ΔZ) from the offset data (Xα, Zα) and the cutting edge data (m, n); and a step of performing a cutting on the basis of the turret axis data (αX, αZ).

BRIEF DESCRIPTION OF THE DRAWINGS

FIGS. 3A and 3B are charts of data, FIG. 3A shows data at a time of inputting, and FIG. 3B shows data after calculation;

DETAILED DESCRIPTION OF THE PREFERRED EMBODIMENTS (A: Cutting Machine)

This invention relates to a cutting machine, and a control apparatus for the same. An embodiment of a turret 1 to be controlled by this control apparatus is shown in FIG. 1.

FIG. 1 shows a state in which a cutting edge of a cutting tool 2 has moved from A0 to A3 along a surface of a work to be cut. There are also shown a Z-axis and an X-axis which are coordinates intersecting at a right angle. Values of the coordinates are determined by setting a point of intersection of the X-axis and the Z-axis as a point of origin. An upward direction of the X-axis is set to be positive, and a rightward direction of the Z-axis is set to be positive.

The turret 1 is mounted on a main body of the cutting machine. The turret 1 is capable of rotating about a point B (a turret axis B) in FIG. 1, and can be indexed at arbitrary positions. A structure of the turret is the same as in the related art and therefore, omitted in the drawing.

Four points A0 to A3 are shown as data of the cutting edge. However, in fact, there are arranged a number of data more closely between the points in order to smoothly move the cutting edge along the surface of the work to be cut. In the drawing, A1 and A2 are shown as representatives among points between A0 to A3. According to this invention, the cutting is performed by appropriately rotating the turret 1 maintaining a cutting angle β to be constant.

(B: Control Apparatus)

Figure 2:
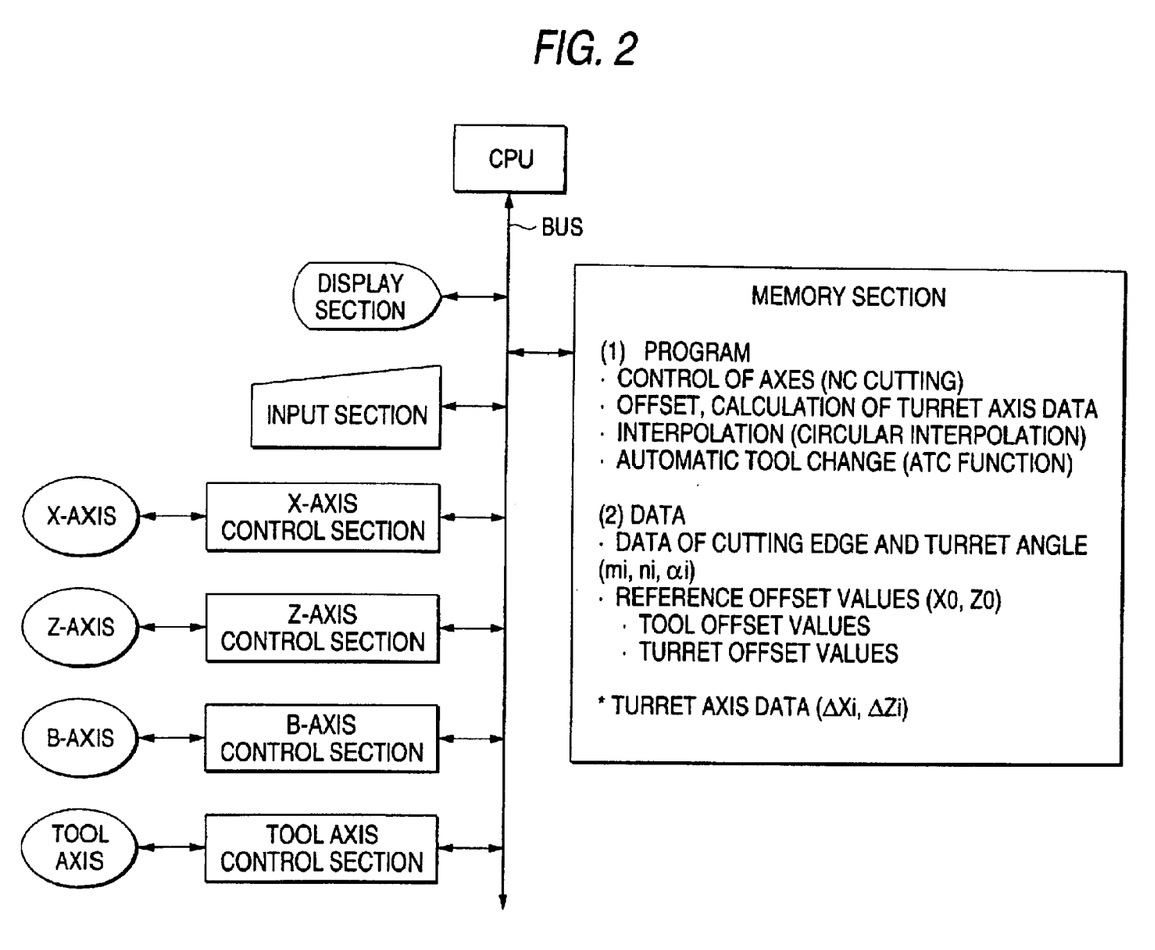
FIG. 2 is a block diagram of a control apparatus.

Then, constituents of the control apparatus are shown in a block diagram of FIG. 2. The control apparatus includes a CPU for performing various treatments, a display section for indicating inputted cutting edge data, an input section for inputting various numerical values, a memory section for storing various programs and reference offset values (X0, Z0) of every cutting tool 2, and a control section for controlling movements of the respective axes. These sections transmit and receive the data by way of buses.

As "the display section", a liquid crystal screen or a CTR can be employed. As "the input section", a keyboard, a touch panel and so on can be employed. Besides, the input may be performed in a manner of reading from a recording medium such as a CD or in a manner of reading various data employing various communication circuits such as a telephone circuit or LAN.

The "control section of the respective axes" such as the X-axis and Z-axis are respectively associated to a motor in order to actuate the motor according to instructions of numerical control given by the CPU or the like, and to vary a relative distance between the cutting tool 2 and the work to be cut with respect to the directions of the axes. Moreover, when the axes are moved by hand, the control section performs functions of reading an amount of control and transmitting it to the CPU.

Because this invention is intended to rotate the turret 1 about the turret axis (the B-axis), there is included a B-axis control section which controls the rotation about the turret axis B and reads its turret angle α. Further, an X-axis control section and a Z-axis control section are provided as an ordinary cutting machine. In case of a cutting machine which can rotate about a tool axis of the cutting tool 2, there is provided a tool axis control section for controlling rotation of this cutting tool 2.

The "memory section" can be implemented by appropriately combining various types of memory means such as RAM, ROM or hard disks.

The memory section stores various programs. Specifically, the programs include a control program of the axes for performing cuttings according to ordinary numerical controls (an NC cutting program), a program for controlling movement of the cutting tool 2 when moving from data of one position of the cutting edge to data of the next position of the cutting edge, and in addition, a program for calculating the offset data (Xα, Zα) and the turret axis data (ΔX, ΔZ) from the reference offset values and the cutting edge data, which is an essence of this invention.

Figure 3A:
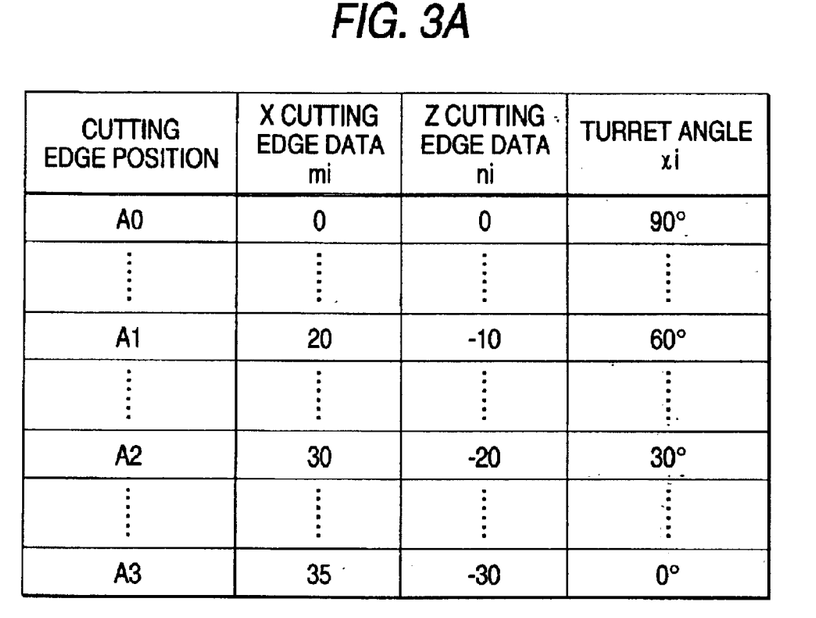

The data to be stored are the X cutting edge data mi, the Z cutting edge data ni, and the turret angle data αi at respective positions of the cutting edge. These data are shown in FIG. 3A. In the drawing, the data of the positions A0 to A3 of the cutting edge are shown.

Storing the data concerning one position of the cutting edge as one record, the X cutting edge data mi, the Z cutting edge data ni, and the turret angle data αi are provided as fields. These values are determined by the programmer and inputted (read) at the input section. Although the data of only four positions of the cutting edge are shown in FIG. 3A, the actual data are set more closely between A0, A1, A2 and A3.

Although the more closely the positions of the cutting edge are set, the larger treating load (load of calculation) of the control apparatus will be, control and moving process of the cutting tool 2 will be more smoothly performed. On the other hand, when the positions of the cutting edge are set roughly, the treating load will be decreased although the control and the moving process will be rough. Therefore, number of the data (number of records) concerning the positions of the cutting edge may be appropriately determined in consideration of an object of cutting, required precision, and ability of the control apparatus.

Further, in case of the cutting machine in which a plurality of the cutting tools 2 can be used by means of the ATC, the X reference offset value X0 and the Z reference offset value Z0 of every cutting tool 2 are recorded in this memory section. These reference offset values may be stored as a sum of the tool offset values (K1, K2) determined by the cutting tool 2, and the turret offset values (T1, T2) from the turret axis B to a (tool) spindle to which the cutting tool 2 is attached.

In case of an embodiment in which the turret axis data have been calculated prior to the cutting process, the calculated turret axis data are stored in the memory section.

(C: Flow of Operation)

Figure 4:
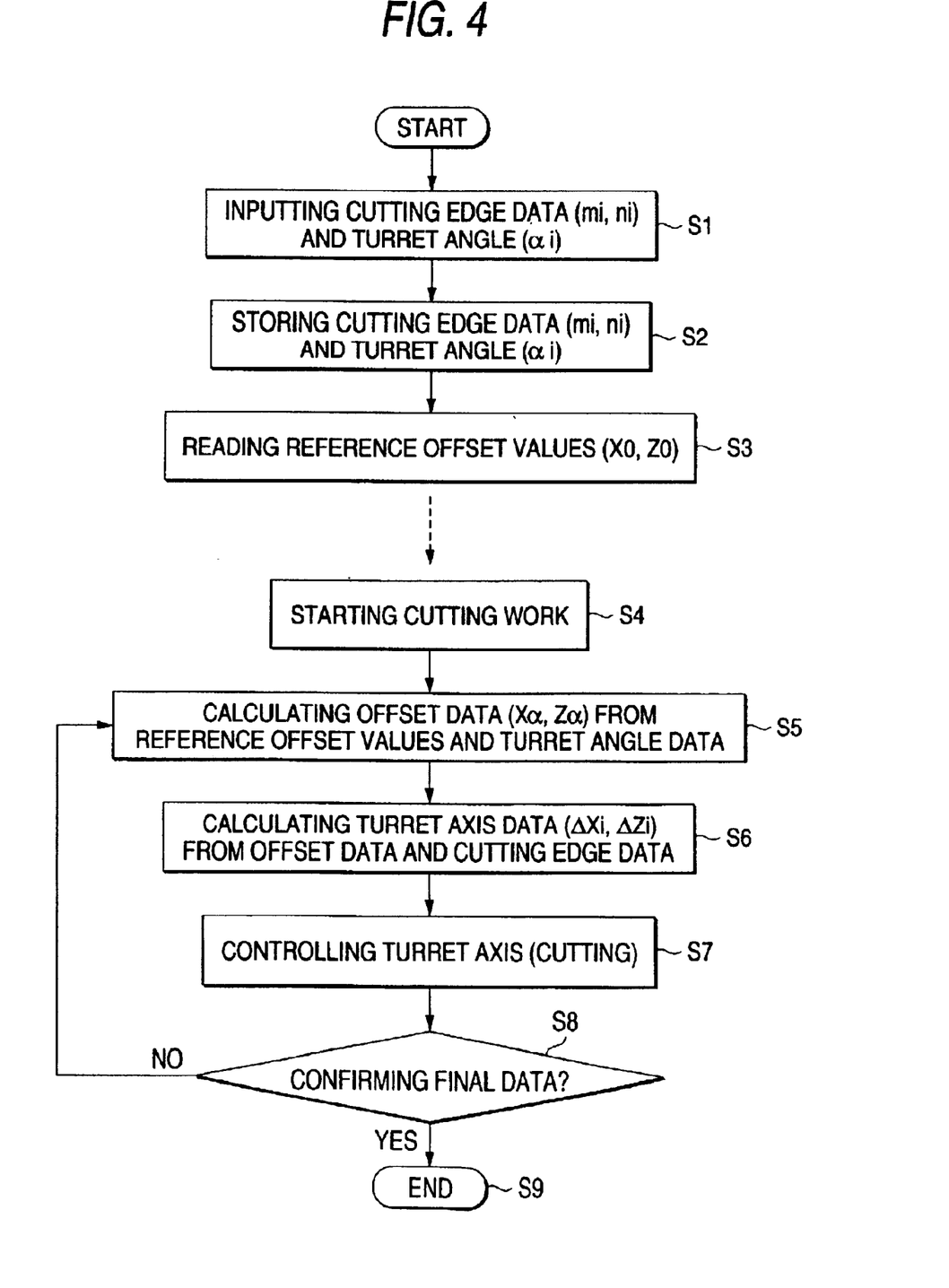
FIG. 4 is a flow chart of cutting steps.

Flow of operation by the cutting machine having this control apparatus will be described referring to FIG. 4.

(S0) As preliminary preparation, the work to be cut is fixed, and the cutting tool 2 desirable for cutting is selected and mounted.

(S1) An operator determines the data of the cutting edge (mi, ni) at respective positions according to a configuration to be cut, and inputs them at the input section. Then, the operator determines to what extent the turret 1 is to be rotated at every position of the cutting edge, and inputs the turret angle data αi. In this embodiment, the X cutting edge data mi, the Z cutting edge data ni, and the turret angle data αi are as shown in FIG. 3A.

(S2) All the data inputted are given to the memory section by way of the buses and stored there.

(S3) The reference offset values (X0, Z0) of the selected cutting tool 2 are read from the memory section. In this embodiment, the X reference offset value X0=5, and the Z reference offset value Z0=40.

(S4) The cutting is started.

(S5) The CPU reads the calculation program from the memory section, and executes the program. At first, the CPU reads the cutting edge data (m0, n0) and the turret angle data α0 at the position A0 of the cutting edge from the memory section. Then, the offset data (Xα0, Zα0) are obtained employing the following equations (equation 1) and (equation 2) for calculating the offset data. Since the turret angle data α0=90°, in case where the cutting edge is at the position A0, the calculation will be as follows;

$$X\alpha 0 = 40 \cdot \cos 90° - 5 \cdot \sin 90° \quad \text{(equation 1)}$$

$$Z\alpha 0 = 40 \cdot \sin 90° + 5 \cdot \cos 90° \quad \text{(equation 2)}$$

$$X\alpha 0 = -5, Z\alpha 0 = 40.$$

(S6) The CPU obtains the turret axis data (ΔX, ΔZ) from the above described offset data (Xα0, Zα0) and the cutting edge data (m0, n0) employing the following equations (equation 3) and (equation 4). Since the coordinates of A0 is (0, 0), in case where the cutting edge is at the position A0, the calculation will be $$\Delta X0 = 0 - 5, \quad \text{(equation 3)}$$

$$\Delta Z0 = 0 + 40 \quad \text{(equation 4), and}$$

$$\Delta X0 = -5 \text{ and}$$

$$\Delta Z0 = 40$$

(S7) The CPU sends a value of ΔX0 to the X-axis control section, a value of ΔZ0 to the Z-axis control section, and a value of α=90° to the B-axis control section respectively. The respective axis control sections actuate the motor and to place the cutting edge into a position of A0 in FIG. 1.

(S8) The CPU confirms whether or not the turret axis data are the final data, referring to the memory section, and as the answer is No, returns to the above (S5).

(S5, S6, S7) The CPU reads the next data of the position of the cutting edge, calculates the offset data, calculates the turret axis data adding the cutting edge data to these offset data. Then, the turret axis is moved and controlled on the basis of the turret axis data to proceed the cutting. Repeating the steps, the position of the cutting edge are moved from A0 to A3, performing the cutting.

Since in case where the cutting edge is at the position A1, the coordinates of A1 are (20, −10), and the turret angle α=60°, the calculation will be as follows;

$$X\alpha 1 = 40 \cdot \cos 60° - 5 \cdot \sin 60° \quad \text{(equation 1)}$$

$$Z\alpha 1 = 40 \cdot \sin 60° + 5 \cdot \cos 60° \quad \text{(equation 2)}$$

$$X\alpha 1 = 15.7, Z\alpha 1 = 37.1$$

Then, the turret axis data are calculated from these offset data as follows;

$$\Delta X1 = 20 + 15.7 \quad \text{(equation 3),}$$

$$\Delta Z1 = -10 + 37.1 \quad \text{(equation 4), and}$$

$$\Delta X1 = 35.7 \text{ and } \Delta Z1 = 27.1$$

Figure 3B:
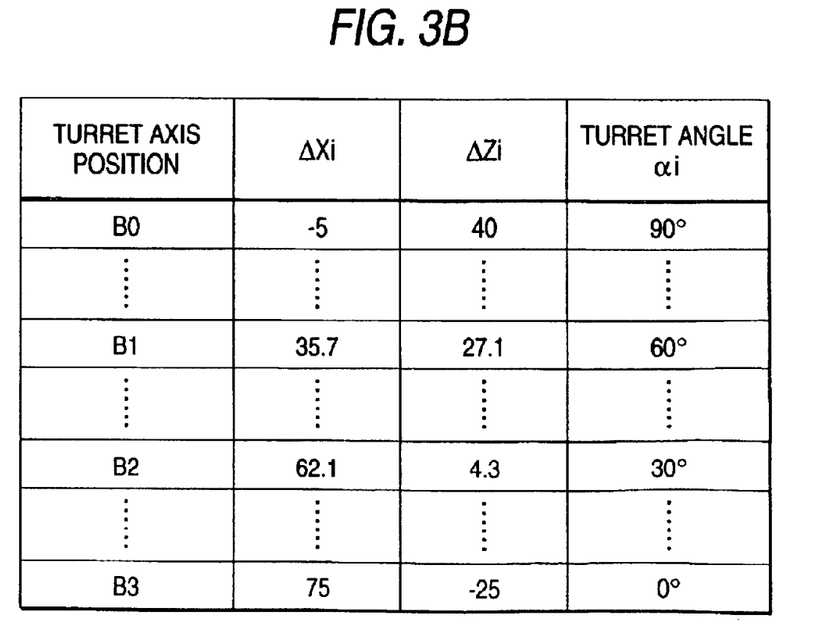

In the same manner, calculated values of the turret axis B at B2 and B3 are shown in FIG. 3B. In case where the coordinate of the X-axis is indicated by diameter, this value of ΔX is to be doubled.

(S8) The CPU confirms that the data on the position A3 of the cutting edge are the final data, and (S9) ends the cutting.

(C1) This invention can be implemented by designating the turret angles α at all the positions of the cutting edge. Moreover, by designating the turret angles α of the essential positions of the cutting edge, the invention can be implemented in a manner of interpolating the turret angles between them.

Figure 5:
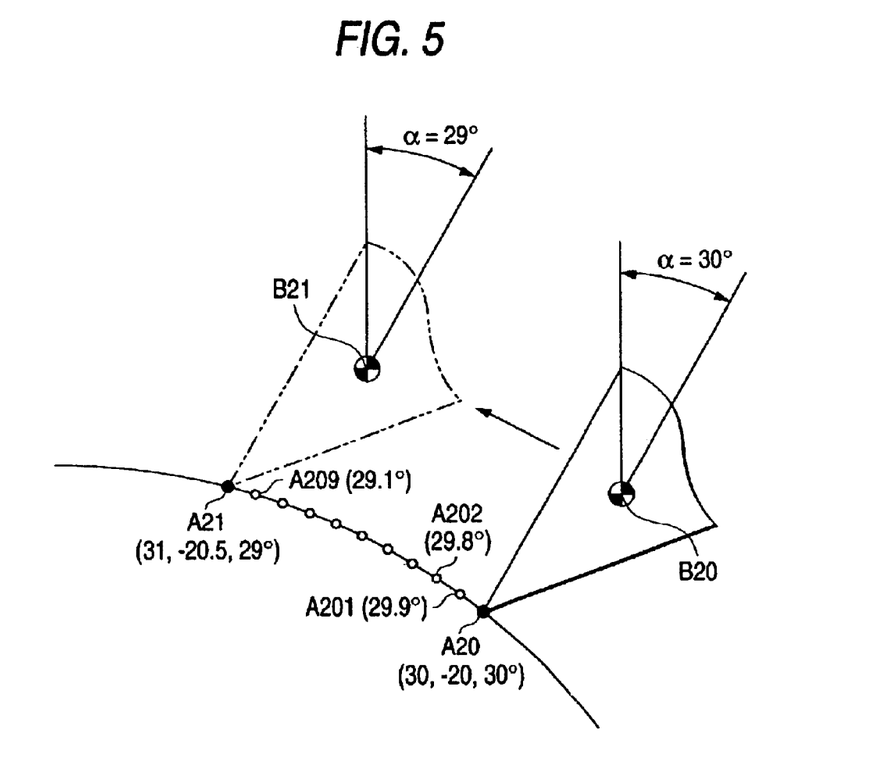
FIG. 5 is a view for explaining interpolation control (with a cutting edge enlarged)

FIG. 5 is an enlarged view of the moving cutting edge, and shows the cutting edge moving from A20 at the turret angle α=30° to A21 at the turret angle α=29°.

The cutting edge data are A20 (30, −20, α=30°), and A21 (31, −20.5, α=29°). At the positions of the cutting edge between A20 and A21, the cutting edge data only are designated, but the turret angles are not designated. In FIG. 5, the B-axis is shown near the cutting edge, for illustrative convenience, to indicate the turret angle α.

When the turret 1 is moved from A20 to A201, which is the next position of the cutting edge, the CPU reads the next cutting edge data. Because the turret angle is not yet set, the CPU reads the value of 30° at A20 and the value of 29° at A21, and recognizes that a rotation of 1° is required by A21. Further, the CPU reads number of the cutting edge data from A20 to A21 (10 in this embodiment) . Because the rotation of 1° is performed by ten movements, the cutting edge is rotated at every 0.1° between A201 to A209, and set to be α=29.9° at A201 and α=29.8° at A202. This function is called as circular interpolation function.

As described, in implementing this invention, it is not necessary to input the turret angles α at all the positions of the cutting edge. The invention can be implemented by inputting the turret angles α only at the essential positions of the cutting edge employing this circular interpolation function.

It is also possible to automatically interpolate and set the cutting edge data employing the conventional interpolation functions between two positions of the cutting edge.

Figure 7:
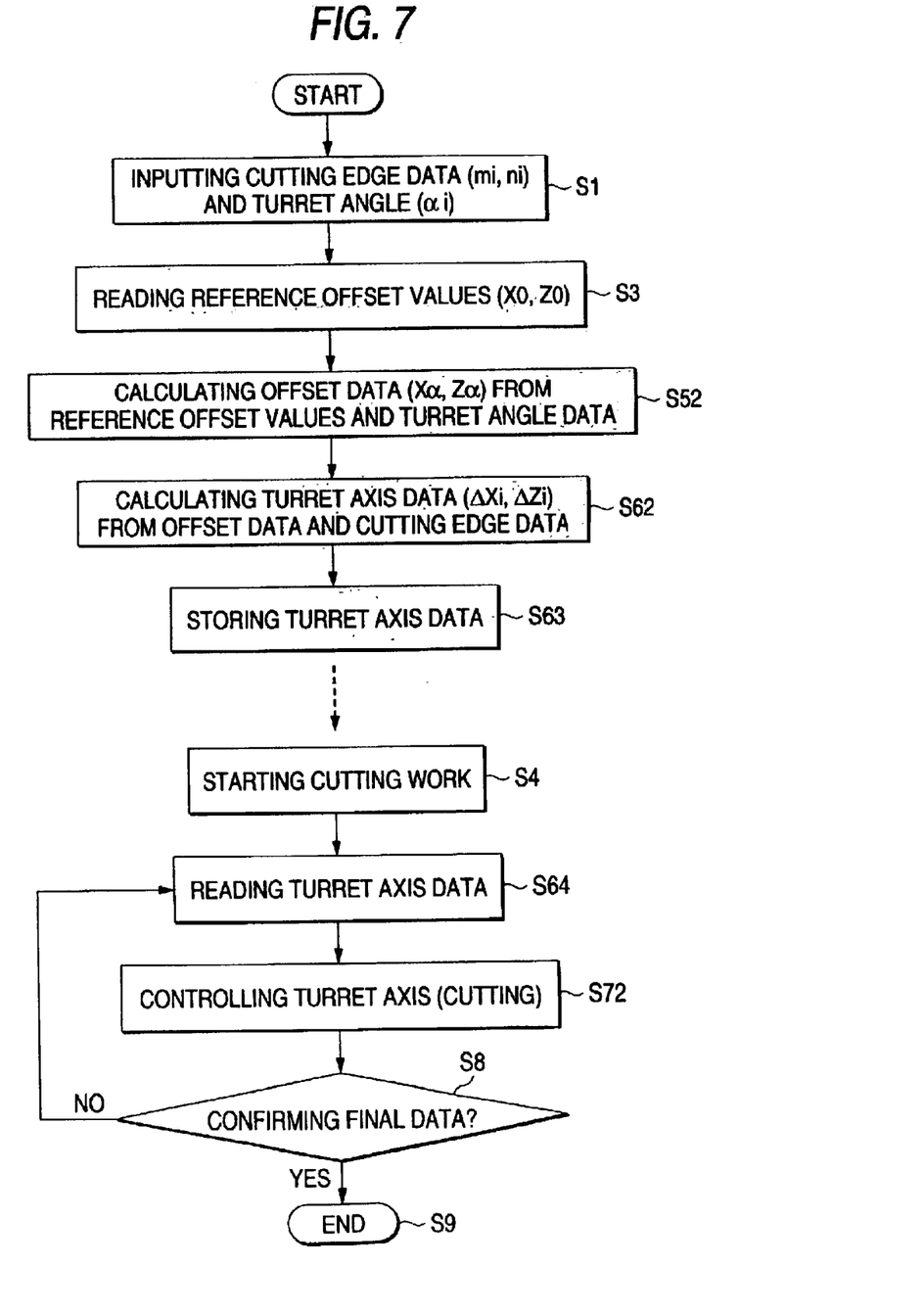
FIG. 7 is a flow chart of cutting steps (No. 2)

(C2) In the above described flow of operation according to the invention, the turret axis data are sequentially calculated from the cutting edge data to control the turret axis B. However, the invention can be implemented in a manner of inputting the positions of the cutting edge, calculating the turret axis data when the cutting tool 2 is selected, and storing the data. A flow of such embodiment is shown in FIG. 7.

In this flow, after the step of inputting the cutting edge data and the turret angle data (S1) and the step of selecting the cutting tool 2 and reading the reference offset value (S3), a step of calculating the offset data (S52) and a step of calculating the turret axis data (S62) are performed, and the values are stored in the memory section (S63) Constituents of the stored turret axis data are shown in FIG. 3B.

When the cutting has started (S4), the CPU reads, instead of reading the cutting edge data, the turret axis data which have already been calculated (S64), and controls cutting the turret axis B on the basis of these data (S72).

Then, the steps are repeated until the final turret axis data.

(1) According to this invention, it will be possible to perform the cutting in a state where the cutting angle β is constant, by inputting the turret angles and the cutting edge data. In this manner, the cutting with high precision can be performed.

(2) The programs and data for making the cutting angle β constant can be easily prepared.

In the above description, the positions of A0 to A3 and B0 to B3 have been described, assuming that the position A0 of the cutting edge is an origin point of the coordinates. However, the origin point and the coordinates can be optionally set. For example, the position B0 can be the origin point of the B-axis.

Moreover, the origin point can be moved along with the movement of the B-axis from B0 to B3, and the coordinates of the cutting edge A can be defined by making this position of the moved B-axis as the origin point. Specifically, when the B-axis (B1) in FIG. 1 is the origin point, the coordinates of the cutting edge at A1 are specified by setting this B1 as the origin point, and the coordinates are set to be A1 (−15.7, −37.1). In this embodiment, it would be easy to recognize and designate the positions of the cutting edge in the program for controlling the turret with reference to the B-axis.

Accordingly, the desirable control apparatus and the cutting machine having this control apparatus according to this invention is the control apparatus which has been heretofore described and includes means for designating the coordinates of the cutting edge with reference to the moving B-axis, means for indicating the coordinates of the cutting edge with reference to the moving B-axis, and means for controlling the cutting edge employing the coordinates of the cutting edge with reference to the moving B-axis.

What is claimed is:

1. A control apparatus for numerical control in a cutting machine having a turret to be rotated to arbitrary positions, said control apparatus comprising:

means for inputting cutting edge data (m, n) indicating a position of a cutting edge of a cutting tool;

means for inputting turret angle data ($\alpha$) indicating an extent of rotation of said turret;

means for reading reference offset values (X0, Z0) corresponding to a length from said cutting edge to a turret axis (B);

means for obtaining offset data (x$\alpha$, Z$\alpha$) from said reference offset values (X0, Z0) and said turret angle data ($\alpha$);

means for adding said cutting edge data (m, n) to said offset data (X$\alpha$, Z$\alpha$) to obtain turret axis data ($\Delta$X, $\Delta$Z); and means for moving said turret on the basis of said turret axis data ($\Delta$X, $\Delta$Z) to perform a cutting.

2. A control apparatus according to claim 1, wherein a set (X$\alpha$i, Z$\alpha$i) of said offset data (X$\alpha$, Z$\alpha$) corresponding to a position of said cutting edge is calculated from said reference offset values (X0, Z0) and the corresponding turret angle data ($\alpha$i) on the basis of the following equations 1 and 2.

$$X\alpha i = Z0 \cdot \cos \alpha i - X0 \cdot \sin \alpha i \quad \text{(equation 1)}$$

$$Z\alpha i = Z0 \cdot \sin \alpha i + X0 \cdot \cos \alpha i \quad \text{(equation 2)}.$$

3. A control apparatus according to claim 2, wherein a set of said turret axis data ($\Delta$Xi, $\Delta$Zi) corresponding to a position of said cutting edge is calculated from the corresponding offset data (X$\alpha$i, Z$\alpha$i) and the corresponding cutting edge data (mi, ni) on the basis of the following equations 3 and 4.

$$\Delta Xi = mi + X\alpha i \quad \text{(equation 3)}$$

$$\Delta Zi = ni + Z\alpha i \quad \text{(equation 4)}.$$

4. A cutting machine including the control apparatus according to any of claims 1 through 3.

5. A cutting method employing a cutting machine having a turret to be rotated to arbitrary positions, comprising the steps of;

inputting cutting edge data (m, n) and turret angle data $\alpha$;

reading reference offset values (X0, Z0);

calculating offset data (X$\alpha$, Z$\alpha$) from said turret angle data ($\alpha$) and said reference offset values (X0, Z0);

calculating turret axis data ($\Delta$X, $\Delta$Z) from said offset data (X$\alpha$, Z$\alpha$) and said cutting edge data (m, n); and performing a cutting on the basis of said turret axis data ($\Delta$X, $\Delta$Z).

6. A cutting method according to claim 5, wherein a set (X$\alpha$i, Z$\alpha$i) of said offset data (X$\alpha$, Z$\alpha$) corresponding to a position of said cutting edge is calculated from said reference offset values (X0, Z0) and the corresponding turret angle data ($\alpha$i) on the basis of the following equations I and 2.

$$X\alpha i = Z0 \cdot \cos \alpha i - X0 \cdot \sin \alpha i \quad \text{(equation 1)}$$

$$Z\alpha i = Z0 \cdot \sin \alpha i + X0 \cdot \cos \alpha i \quad \text{(equation 2)}.$$

7. A cutting method according to claim 6, wherein a set of said turret axis data ($\Delta$Xi, $\Delta$Zi) corresponding to a position of said cutting edge is calculated from the corresponding offset data (X$\alpha$i, Z$\alpha$i) and the corresponding cutting edge data (mi, ni) on the basis of the following equations 3 and 4.

$$\Delta Xi = mi + X\alpha i \quad \text{(equation 3)}$$

$$\Delta Zi = ni + Z\alpha i \quad \text{(equation 4)}.$$

* * * * *